UNITED STATES PATENT OFFICE.

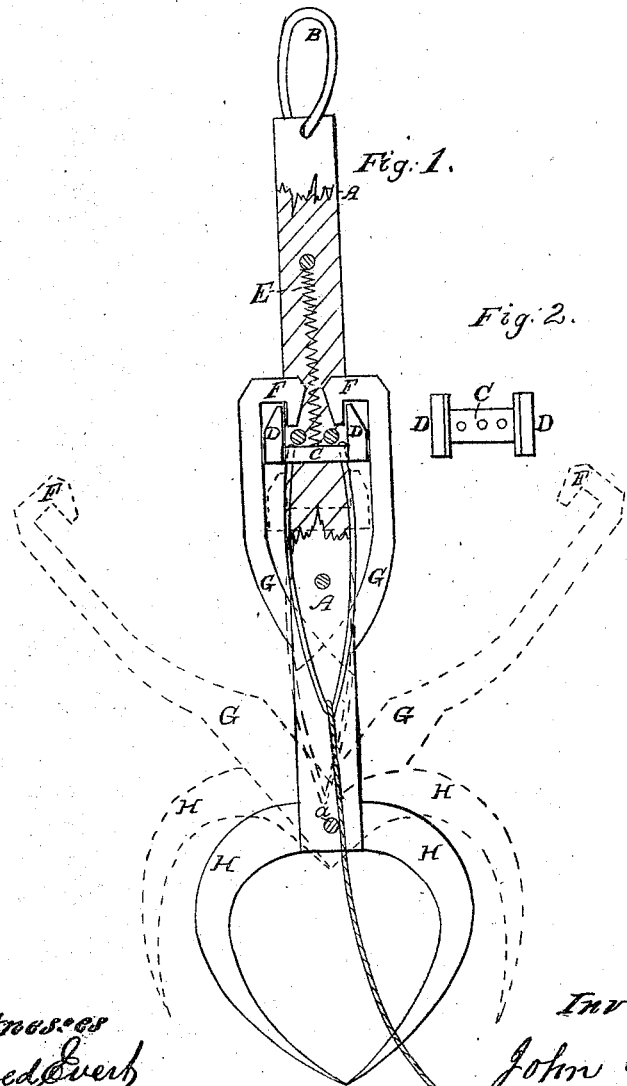

JOHN A. MILLER, OF SHIPPENSBURG, PENNSYLVANIA.

IMPROVEMENT IN HORSE HAY-FORKS.

Specification forming part of Letters Patent No. 87,696, dated March 9, 1869; antedated February 27, 1869.

*To all whom it may concern:*

Be it known that I, JOHN A. MILLER, of Shippensburg, in the county of Cumberland, and in the State of Pennsylvania, have invented certain new and useful Improvements in Hay-Forks; and I do hereby declare that the following is a full, clear, and exact description thereof, reference being had to the accompanying drawings, and to the letters of reference marked thereon.

The nature of my invention consists in the construction and general arrangement of a hay-fork which, in point of simplicity, cheapness, durability, and easy adoption to the purpose intended, is superior to any fork now in use. It may be most properly called the "scissors hay-fork," with handles like smiths' tongs, working on a rivet or screw, like a pair of scissors, with prongs somewhat in a semi-elliptical form.

In order to enable others skilled in the art to which my invention appertains to make and use the same, I will now proceed to describe its construction and operation, referring to the annexed drawings, which form a part of this specification, and in which—

Figure 1 is a side elevation, part in section; and Fig. 2, a plan view of the cross-bar with catches holding the prongs in proper position.

A represents a flat piece of iron that is bent in the middle, and a rivet or screw, a, goes through both ends of the same. Instead of one piece of iron, it may be two pieces of iron put together with rivets at the top. The pieces of iron A above the rivet a are pressed nearly together, so as to leave a small open space between them extending up between the handles, at the top of which is a ring, B, with a rope extending to the horse-power. In the space or opening thus formed is a small rod or bar, C, extending crosswise, capable of sliding up and down, with a catch or hook, D D, on each end, and suspended on a small spiral spring, E. These hooks D D catch on hooks F F, one of which is on each handle. The handles G G are pivoted on the rivet a inside of the lower end of the bar A, and provided at their lower ends, below the bar A, with prongs H H in a semi-elliptical form, as shown in Fig. 1, and working, so to say, like a pair of scissors.

By pulling a small rope attached to the cross-bar C the hooks will detach from the hooks in the handles and the weight of the hay will cause the prongs to open, and the hay will fall off, at which time it is ready to penetrate the hay again, the tongs generally closing as it is sunken downward, as the cog-wheel fork; but if it should sometimes fail to close itself the handles in the form of scissors give ample lever-power to close it with ease, as there is scarcely any friction, thus having the advantage over the cog-wheel fork or any other fork now in use.

Thus the whole thing can be put up of four pieces of iron, one bolt, (and four nails, if preferred,) and one small spring, so simple that any blacksmith can make it all without difficulty, thereby saving the trouble and expense of sending off to a machine-shop for any part of it, as well as saving many bolts and fixtures requisite for all complicated machinery.

Having thus fully described my invention, what I claim as new, and desire to secure by Letters Patent, is—

1. The handles G G, provided at their lower ends with semi-elliptical prongs H H, and pivoted in the bar A by means of the rivet or screw a, substantially as and for the purposes herein set forth.

2. The cross-bar C, provided with catches D D, and suspended by the spring E in the bar A, substantially as and for the purposes herein set forth.

In testimony that I claim the foregoing I have hereunto set my hand this 4th day of August, 1868.

JOHN A. MILLER.

Witnesses:
A. A. YEATMAN,
LEOPOLD EVERT.